2,961,428
POLYACETAL-POLYISOCYANATE POLYMERS

Erwin Muller and Gunther Braun, Leverkusen, Germany, assignors, by direct and mesne assignments, of one-half to Farbenfabriken Bayer Aktiengesellschaft, Leverkusen, Germany, a corporation of Germany, and one-half to Mobay Chemical Company, Pittsburgh, Pa., a corporation of Delaware No Drawing. Filed Oct. 18, 1956, Ser. No. 616,629

Claims priority, application Germany Oct. 24, 1955

2 Claims. (Cl. 260—49)

This invention relates generally to synthetic polymeric materials and to methods of making such materials and more particularly to polyurethane plastics having improved physical characteristics and stability.

Polyurethane plastics of high molecular weight can be produced from polyisocyanates and compounds having hydroxyl groups. Polyesters, polyester amides, polyethers, polythioethers and the hydrogenated copolymers of carbon monoxide and ethylene have been disclosed as compounds suitable for reacting with the polyisocyanates to form various types of plastic materials including foams and rubber-like materials. The resulting plastic materials are useful for making various foamed articles of manufacture, lacquers, adhesives, textile coatings, various types of elastomeric products and casting resins. Polyurethanes made from polyesters and isocyanates have been found particularly advantageous in commerce but they have the disadvantage of having ester groups within their structure which under some conditions may be saponified. Consequently, such polyurethanes may decompose to some extent if exposed to elevated temperatures or high humidity or if used for an extended period of time even under normal conditions. This decomposition is accompanied by unfavorable changes in the properties of the polyurethanes.

It is therefore an object of this invention to provide a novel plastic material formed by the reaction of a polyisocyanate with a polyhydroxy compound. Another object of the invention is to provide an improved polyurethane-type plastic that is resistant to saponification and a method for making the same.

The foregoing objects as well as others that will become apparent from the following description are accomplished in accordance with this invention, generally speaking, by providing a method for making isocyanate-modified plastics wherein a polyisocyanate is reacted with a compound produced by the condensation of an aldehyde with a polyhydroxy compound. The condensation product of the aldehyde and polyhydroxy compound has within its chain an acetal grouping —O—CHR—O— wherein R is a member selected from the group consisting of hydrogen, an aliphatic hydrocarbon radical and an aromatic hydrocarbon radical. The hydrocarbon radical of the acetal grouping may be either branched or linear and either saturated or unsaturated.

The condensation product of the polyhydroxy compound and an aldehyde may be produced by any suitable conventional method for forming compounds of this type. Any suitable aldehyde may be used. Formaldehyde is preferred and it is preferably added as paraformaldehyde. If formaldehyde is condensed with a dihydric alcohol, an acetal having the grouping —O—CH$_2$—O— is formed, whereas substituted acetals are formed if other aldehydes, such as, for example, acetaldehyde, propionaldehyde, butyric aldehyde, isobutyric aldehyde, benzaldehyde, cinnamic aldehyde, acrolein, crotonaldehyde, β-ethyl-α-methyl acrolein, α-methyl acrolein and the like, are utilized. Such acetals have the grouping

in which the R represents a side group of an aliphatic or aromatic hydrocarbon radical.

Any suitable polyhydroxy compound that will form an acetal with an aldehyde may be utilized in the condensation process with the aldehyde, but it is preferred to use a polyhydroxy compound that will not form cyclic acetals with the aldehyde. Examples of polyalcohols that are particularly advantageous in the condensation process are hexanediol, butane-bis-beta-dihydroxyethylether, trimethylol propane, dihydroxyethylether, diethylene glycol, triethylene glycol and other polyethylene glycols, aromatic polyalcohols having aliphatically bonded hydroxyl groups, such as, for example, the product obtained by reacting an aromatic polyhydroxy compound with glycol chlorhydrin and the following aromatic-type compounds:

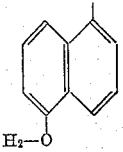
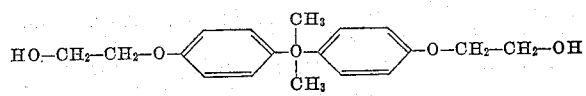
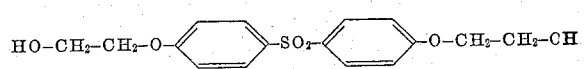

Low molecular weight hydroxyl polyesters, hydroxyl polyethers, hydroxyl polythioethers or monomeric glycols containing carbamide and urethane groupings, such as, for example, adipic acid diethanolamide or hexamethylene-beta-dihydroxyethyl urethane, may also be utilized in forming the condensation product with the aldehyde and such a process and the product thereof are contemplated by the invention. Moreover, mixtures of the various polyhydroxy compounds enumerated herein may be reacted with the aldehyde to form suitable acetals. By avoiding polyhydroxy compounds that form cyclic acetals, polymers are obtained having the

linkage. Furthermore, mixtures of compounds having the acetal linkage with polyhydroxy compounds not having such a linkage may be used.

These condensation products with —O—CHR—O— groups can be reacted by methods known per se with polyisocyanates to form various types of polyurethane plastics. Suitable processes for conducting such reactions are disclosed in U.S. Patents 2,620,516, 2,621,166 and 2,729,618.

Any suitable polyisocyanate may be utilized, including tetramethylene diisocyanate, pentamethylene diisocyanate, hexamethylene diisocyanate, m-phenylene diisocyanate, p-phenylene diisocyanate, toluylene-2,4-diisocyanate, toluylene-2,6-diisocyanate, 1,3-xylylene diisocyanate, 1,4-xylylene diisocyanate, 1,4-naphthylene diisocyanate, 1,5-naphthylene diisocyanate, diphenylmethane diisocyanate, diphenyldimethylmethane diisocyanate, benzidinsulfone diisocyanate, diphenylmethane sulfone diisocyanate, dimeric diisocyanates, such as, for example, the following:

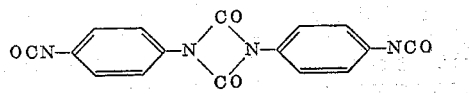

and the like. In addition, isocyanates in which the isocyanate group has been masked with a component which readily splits off, such as, for example, isocyanates masked with phenols, may be utilized. Such masked isocyanates, upon heating, are converted into compounds having the NCO group by splitting off the phenol or other masking compound.

It is preferred to use slightly more aldehyde than the theoretical amount in order to compensate for losses caused by vaporization during the condensation process. This is particularly true when the volatile aldehydes are utilized. Obviously, when a deficiency of aldehyde is present the size of the resulting molecule is less and the OH number is greater than when the theoretical amount of aldehyde is present to react with the polyhydroxy compound. In forming the condensation product, one molecule of aldehyde is used to link two molecules of the polyhydroxy compound in forming each —O—CHR—O— grouping within the chain of the finished product. Therefore, if only two molecules of the polyhydroxy compound were to be linked, only one molecule of the aldehyde would be required, but as the chain becomes longer, the ratio of the aldehyde molecules to polyhydroxy compound molecules approaches 1:1.

The condensation of the polyalcohols with aldehydes can take place in known manner, either in the form of a melt or at the boiling temperature of a solvent in the presence of acid catalysts, such as, for example, p-toluenesulfonic acid. It is, however, preferred to work in the presence of solvents which, like benzene, toluene or chlorobenzene, remove azeotropically the water of condensation which is split off. Heating is carried out until no more water distills off.

The condensation product obtained from the reaction between the aldehyde and the polyhydroxy compound is a viscous oil. The condensate may be either linear or branched as pointed out hereinbefore. Divalent alcohol and formaldehyde produce linear condensates, whereas alcohols having more than two hydroxyl groups when reacted with formaldehyde produce branched polymers. As pointed out above, the size of the molecule and the hydroxyl number is dependent upon the molecular ratio of aldehyde to polyhydroxy compound.

As stated hereinbefore, the condensation product of the reaction between the aldehyde and polyhydroxy compound is reacted with a polyisocyanate to form a polyurethane plastic. The reaction may be conducted with more isocyanate than the theoretical amount required to react with the hydroxyl group. For example, an excess of diisocyanate may be reacted with a divalent or other polyvalent alcohol or with a low molecular weight polyester having the acetal linkages to produce a plastic having desirable characteristics for some purposes. The product obtained from the reaction of the excess of polyisocyanate with the compound having the hydroxyl groups and acetal linkage may also be reacted either simultaneously or in a subsequent reaction with water, a glycol, an amine or an aminoalcohol which acts as a cross-linking agent between the molecules of the isocyanate-modified polyhydroxy compound. If water is used as a cross-linking agent, a foam product of low specific gravity is obtained, whereas glycols and diamines produce rubber-like materials. The cross-linking reaction is preferably carried out in the presence of suitable reaction accelerators or catalysts, such as, for example, a tertiary amine which may be added per se to the mixture or may be incorporated in the condensation product before it is mixed with the cross-linking agent.

In accordance with another embodiment of the invention the hydrogyl group containing condensation products having the —O—CHR—O— group or groups is first reacted with less than the theoretical amount of diisocyanate required to react with all of the hydroxyl groups. If a tertiary amine containing free OH groups, such as, for example, methyldiethanolamine or triethanolamine, is added it will react with the condensation product and is incorporated in the isocyanate-modified product. The resulting isocyanate-modified products which still contain free hydroxyl groups may then be reacted with additional quantities of polyisocyanates and, if desired, one of the aforementioned cross-linking agents may also be included in the reaction mixture or reacted with the final polyisocyanate-modified product, if desired.

It has been found that a plastic produced from a polyhydroxy compound having the acetal grouping —O—CHR—O— in its chain is more resistant to saponification by alkalies and water than the heretofore available plastics prepared from polyesters and isocyanates. Indeed, it has been found that the products obtained by the invention are resistant even to a hot caustic soda solution. Moreover, deterioration due to aging of the product even when the product has been exposed for long periods of time to high humidities and atmospheres and elevated temperatures cannot be detected. These physical characteristics contrast the product of the invention from the heretofore available isocyanate-modified polyester-based plastics in having the acetal-type grouping in the chain of the polymer.

In order better to describe and further clarify the invention, the following are specific examples thereof:

*Example 1*

About 900 grams of butanediol-1,4, about 316 g. of dimethylmethanediphenyl - 4,4' - bis-beta-dihydroxyethyl-ether and about 330 g. of paraformaldehyde are suspended in about 800 cc. of benzene and heated to the boiling point of benzene with addition of about 3 g. of p-toluenesulfonic acid. An azeotropic mixture of water and benzene is distilled off until no more water passes over. Thereafter, the residual benzene is distilled off in vacuo at a pressure of about 20 mm. About 1 kilogram of the resultant polyacetal with the hydroxyl number 65 is mixed with about 20 g. of N-methyl diethanolamine and about 20 g. of triethanolamine and about 87 g. of toluylene diisocyanate are added dropwise to the mixture at about 90°–100° C. and while stirring well. After completion of the reaction, the mixture is heated for about thirty minutes more at the same temperature and a product is obtained with the hydroxyl number of 54.

About 200 g. of this product are mixed with about 4 g. of a mixture of about 1 g. oleic acid and about 3 g. N-diethyldiethanolamine and about 4 g. of water. After adding about 60 g. of toluylene diisocyanate, foaming is carried out while stirring well. A soft foam product is obtained with the following mechanical properties:

| Bulk weight, g./cc. | Elasticity, percent | Resistance to further tearing, kg./cm. | Tensile strength, kg./cm.² | Elongation, percent | Compression hardness at 40% compression, kg./cm.² |
| --- | --- | --- | --- | --- | --- |
| 0.086 | 30 | 0.74 | 1.62 | 123 | 156 |

*Example 2*

About 1 kilogram of a condensation product with the hydroxyl number 81 is prepared by substantially the same process as described in conjunction with Example 1. About 3.6 kg. of butanediol and about 1.2 kg. of paraformaldehyde, about 2 liters of benzene and about 10 grams of p-toluenesulfonic acid are mixed with about 10 g. of butanediol and about 20 g. of trimethylol propane in this embodiment. About 117 g. of toluylene diisocyanate are added dropwise to this mixture at about 90°–100° C. and while stirring well. After final condensation for about thirty minutes more at the same temperature, a product is obtained which has the hydroxyl number 49.

About 200 g. of this product are mixed with about 6 g. of a mixture of 1 g. oleic acid, about 3 g. of N-diethylethanolamine and about 4 g. of water. After adding about 62 g. of toluylene diisocyanate a foam is formed which has the following mechanical properties:

| Bulk weight, g./cc. | Elasticity, percent | Resistance to further tearing, kg./cm. | Tensile strength, kg./cm.$^2$ | Elongation, percent | Compression hardness at 40% compression, kg./cm.$^2$ |
|---|---|---|---|---|---|
| 0.092 | 36 | 0.98 | 1.38 | 108 | 167 |

After aging in air moisture at about 70° C. the following mechanical properties are obtained:

| Resistance to further tearing, kg./cm. | Tensile strength, kg./cm.$^2$ | Elongation, percent | Compression hardness at 40% compression, kg./cm.$^2$ |
|---|---|---|---|
| 0.96 | 1.07 | 60 | 165 |

*Example 3*

About 36 grams of toluylene diisocyanate are mixed by stirring at about 90°–100° C. with about 1 kilogram of a condensation product (OH number 63) prepared by a process substantially the same as that of Example 1 from about 766 g. of butanedihydroxyethyl glycol, about 248 g. of naphthylene-1,5-betadihydroxyethylether and about 180 g. of paraformaldehyde, with use of about 800 cc. of benzene and about 4 g. of p-toluenesulfonic acid. The addition product which is formed has an hydroxyl number of 47.

About 100 g. of this product are mixed with about 3 g. of an ester obtained from about 1 mol of adipic acid and about 2 mols of N-diethyl diethanolamine, about 1 g. of diethyl ammonium oleate and about 2 g. of water and thereafter foamed with about 30 g. of toluylene diisocyanate. The foam obtained has the following mechanical values:

| Bulk weight, g./cc. | Elasticity, percent | Resistance to further tearing, kg./cm. | Tensile strength, kg./cm.$^2$ | Elongation, percent |
|---|---|---|---|---|
| 0.071 | 26 | 0.96 | 1.57 | 226 |

*Example 4*

A condensation product with the hydroxyl number 190 is prepared from about 532 grams of trihydroxyethyl trimethylol propane, about 158 g. of dimethylmethane-diphenyl-4,4'-beta-dihydroxyethylether and about 75 g. of paraformaldehyde, using about 500 cc. of benzene and about 2.5 g. of p-toluenesulfonic acid, and then a 75% solution of this product in acetic acid ester is produced. About 50 cc. of this solution are mixed by stirring with about 30 cc. of a 75% solution of a triisocyanate prepared by reacting about one mol of trimethylol propane with about three mols of toluylene diisocyanate. The mixture is coated on to plates, and after about 3 to 4 hours, it yields an air-dried film which is characterized by very good resistance to alkali.

*Example 5*

About 200 grams of a condensation product with the hydroxyl number 56 and prepared from about 766 g. of butanedihydroxyethyl glycol, about 316 g. of dimethyl-methane-diphenyl-4,4'-bis - beta - dihydroxyethylether and about 180 g. of paraformaldehyde, using about 800 cc. of benzene and about 3 g. of p-toluenesulfonic acid are heated at about 90°–100° C. under a vacuum of about 12 mm. and dehydrated at about 130° C. About 34 g. of 1,5-naphthylene diisocyanate are then mixed therewith by stirring. The temperature is raised to about 138°–140° C. and after the melt has cooled again to about 130° C. about 4 g. of butanediol are added while stirring. The homogeneous melt is now poured into molds and heated for about 24 hours more at about 100° C. On emptying the molds, a transparent elastomeric material is obtained.

Although the invention has been described in considerable detail in the foregoing with reference to specific embodiments thereof, such detail has been presented solely for the purpose of illustration and modifications can be made therein by those skilled in the art without departing from the spirit and scope of the invention except as is set forth in the claims.

What is claimed is:

1. A polyurethane plastic which comprises the reaction product of (*a*) a polyacetal having at least two hydroxyl groups prepared by heating a polyhydric aliphatic alcohol and a member selected from the class consisting of

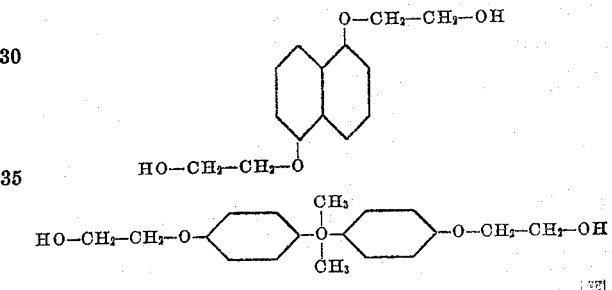

with an aldehyde in an amount sufficient to materially improve the mechanical properties of said polyacetal in a first step and mixing said polyacetal with (*b*) an organic polyisocyanate in a second step to prepare a polyurethane plastic.

2. The product of claim 1 wherein said organic polyisocyanate is a toluylene diisocyanate.

References Cited in the file of this patent

UNITED STATES PATENTS

| 2,071,252 | Carothers | Feb. 16, 1937 |
| 2,277,083 | Dorough | Mar. 24, 1942 |
| 2,430,479 | Pratt et al. | Nov. 11, 1947 |
| 2,511,544 | Rinke et al. | June 13, 1950 |
| 2,692,874 | Langerak | Oct. 26, 1954 |
| 2,813,776 | Koller | Nov. 19, 1957 |

FOREIGN PATENTS

| 956,556 | France | Aug. 15, 1949 |
| 733,624 | Great Britain | July 13, 1955 |

UNITED STATES PATENT OFFICE
CERTIFICATE OF CORRECTION

Patent No. 2,961,428  
November 22, 1960

Erwin Muller et al.

It is hereby certified that error appears in the above numbered patent requiring correction and that the said Letters Patent should read as corrected below.

Column 2, lines 27 to 31 and column 6, lines 36 to 39, for that portion of the formula, each occurrence, reading 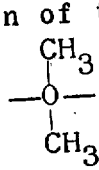 read 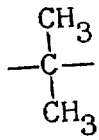

column 3, line 69, for "hydrogyl" read -- hydroxyl --.

Signed and sealed this 12th day of September 1961.

(SEAL)  
Attest:

ERNEST W. SWIDER  
Attesting Officer

DAVID L. LADD  
Commissioner of Patents  
USCOMM-DC